T. R. JAMES.

Tram for Gaging Millstones.

No. 83,503.

Patented Oct. 27, 1868.

THOMAS R. JAMES, OF ST. LOUIS, MISSOURI.

Letters Patent No. 83,503, dated October 27, 1868.

IMPROVED TRAMS FOR GAUGING MILLSTONES.

The Schedule referred to in these Letters Patent and making part of the same.

*To all whom it may concern:*

Be it known that I, THOMAS R. JAMES, of St. Louis, in the county of St. Louis, and State of Missouri, have invented a new and useful Improvement in Trams for Gauging Millstones; and I do hereby declare that the following is a full, clear, and exact description thereof, which will enable others skilled in the art to make and use the same, reference being had to the accompanying drawings, forming part of this specification, in which—

Similar letters of reference indicate like parts.

The nature of my invention relates to improvements in apparatus for tramming or gauging the faces of the upper or running stones of grinding-mills, whereby it is designed to provide a more reliable means for accomplishing the same, which is simpler of adjustment and cheap in construction; and it consists in providing a tram-bush, which may be secured to the stone, by the ends of the same being wedged into the recesses provided for the driver, having a central opening through it vertically, provided with set-screws, wherein a shaft may be set, with its lower end resting in the socket on the bail of the stone, whereby the said shaft may be nicely adjusted to a position exactly perpendicular to the face of the stone. On the upper portion of the said shaft may be arranged a swinging arm, which is provided with one or more gauge-points, as will be more fully described on reference to the accompanying drawings.

A represents an upper or running millstone, with the face upward, as in the position for dressing.

Figure 1:
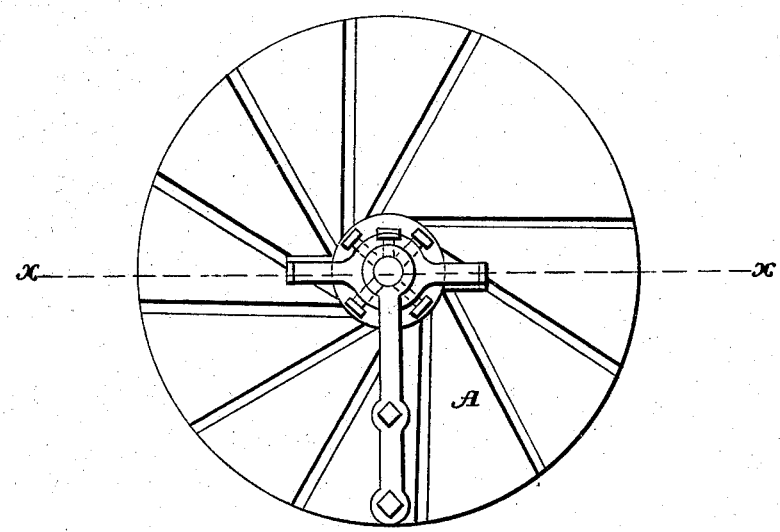
Figure 1 represents a plan view of my improvement applied to a millstone.
Figure 2:
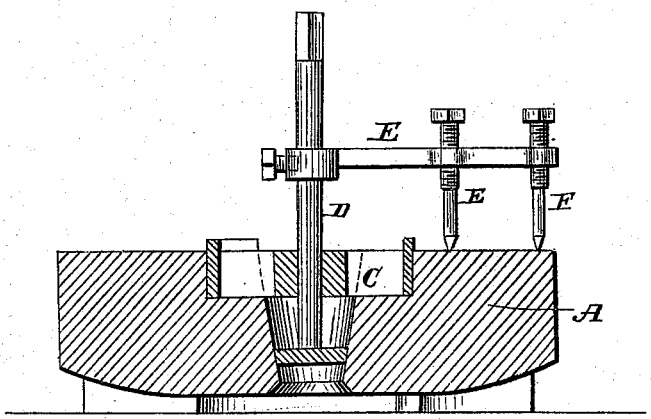
Figure 2 represents a central section through the same.

B represents the bail, which supports it on the running-spindle, and which is provided with a socket, as shown in fig. 2.

C represents a bush, provided with a central opening through it, and set-screws projecting into the said openings, in radial positions. The said bush C is arranged to be secured, by its ends, in the recesses in the stone, in which the ends of the driver work when in the running position.

D represents a vertical shaft, with the lower end passing through the central opening in the said bush, and resting, on its tapered point, in the socket in the bail B.

E represents a swinging arm, secured to the shaft D, by a set-screw, carrying one or more adjustable gauge-pins F.

The socket in the bail B being in the centre of the stone, the shaft may be readily adjusted to a central position by the set-screws, and perpendicular to the face of the stone, in a manner well understood, when, by swinging the arm E, on the shaft, the pointers F being adjusted in the arm E to the proper position, strike against any high points on the face of the stone, at the outer edge, and at the "bosom" of the same, thereby pointing out to the operator the high and uneven points to be dressed off. The apparatus may also be used for gauging and truing the irons when being set into the stone.

Having thus described my invention,

I claim as new, and desire to secure by Letters Patent—

The tram-bush C, constructed as described, bearing the vertical mandrel D, adjustable arm E, and screw-gauge pins F, when secured to the runner by being wedged into the recess provided for the driver, in such a manner as to step the spindle D in the bail B of said runner, as herein shown and described.

THOMAS R. JAMES.

Witnesses:
J. A. BUCKLAND,
G. H. EVERSOLE.